Patented May 7, 1946

2,399,641

UNITED STATES PATENT OFFICE 2,399,641

PURIFICATION OF CRUDE TRICHLORO-ACETYL CHLORIDE

Frederick William Kirkbride, Frodsham, Warrington, England, assignor to Imperial Chemical Industries Limited, a corporation of Great Britain No Drawing. Application October 20, 1941, Serial No. 415,767. In Great Britain January 17, 1941

3 Claims. (Cl. 204—163)

This invention relates to improvements in the manufacture of trichloroacetyl chloride.

In copending application filed August 26, 1940, Serial No. 354,308 now U. S. Patent 2,321,823, there is described and claimed a process for the manufacture of trichloroacetyl compounds by oxidising perchloroethylene with oxygen at an elevated temperature, e. g. 95–110° C., while exposing the liquor to actinic radiation, and then subjecting the oxidised liquor to continued heating, or to the action of an anhydrous metallic chloride, such as aluminum chloride, which evolves heat on treatment with water, or to the action of a primary or secondary amine. Trichloroacetyl chloride is thus obtained which can, if desired, be converted to other trichloroacetyl compounds. It is stated that the oxidation step can be catalysed by introducing into the oxygen stream a small proportion, e. g. 1–20%, of chlorine.

In carrying out the oxidation the last stages of the process become very slow, and from the practical point of view it is not feasible to oxidise all the perchloroethylene. The trichloroacetyl chloride obtained is therefore contaminated with small amounts of perchloroethylene which cannot readily be removed. Fractional distillation, for example, cannot be used successfully for removing the perchloroethylene since the boiling points of the two liquids lie only 3° C. apart.

According to the present invention trichloroacetyl chloride of a high degree of purity is obtained from trichloroacetyl chloride containing perchloroethylene, by treating the impure trichloroacetyl chloride with chlorine to convert perchloroethylene to hexachloroethane, and submitting the product to fractional distillation to isolate trichloroacetyl chloride.

The treatment with chlorine may be carried out at ordinary or elevated temperatures, e. g. 20–118° C., and preferably while irradiating the liquid with actinic radiation, suitably the light from a mercury arc or an incandescent filament lamp. The subsequent fractional distillation may be carried out at ordinary atmospheric pressure, though a reduced or elevated pressure may be used if desired.

The process may be applied to trichloroacetyl chloride containing perchloroethylene obtained from any source, but it is particularly useful as applied to the trichloroacetyl chloride obtained by oxidation of perchloroethylene, for example as described in the aforesaid copending application. Such a material may contain, for example, a 3–20% perchloroethylene which is readily removed by the process of the present invention.

The following example, in which all parts are by weight, illustrates but does not limit our invention:

Example

A mixture containing 315 parts of trichloroacetyl chloride and 35 parts of perchloroethylene in a Pyrex glass vessel ("Pyrex" is a registered trade mark), was heated at 50° C. and irradiated by the light from a mercury arc. A current of dry chlorine was passed in for 9½ hours at a rate sufficient to keep the liquid nearly saturated with the gas. At the end of this time the colour of the chlorine no longer faded from the liquor when the gas was turned off, the reaction was judged to be complete. The product was then distilled through a fractionation column and after rejection of a small initial fraction containing some dissolved chlorine two main fractions were collected as follows: (1) 167 parts distilling at 117.7° C./763 mm. and consisting of trichloroacetyl chloride of 99.8% purity, and (2) 121 parts distilling at 117.7° to 117.8° C./763 mm. and consisting of trichloroacetyl chloride of 97.5% purity. There was left 69 parts of a residue which deposited crystalline hexachloroethane on cooling. If desired fraction (2) could have been redistilled to yield a further quantity of pure trichloroacetyl chloride.

I claim:

1. The method of removing perchloroethylene from crude trichloroacetyl chloride containing the same, which comprises simultaneously irradiating the crude trichloroacetyl chloride with actinic radiation and treating it with a gas consisting essentially of dry chlorine while maintaining such crude material between 20° C. and 118° C., to convert perchloroethylene to hexachloroethane, submitting the resultant product to fractional distillation, and collecting the trichloroacetyl chloride fraction.

2. The method of purifying crude trichloroacetyl chloride containing perchloroethylene as an impurity which comprises passing a current of gas consisting essentially of dry chlorine into said crude trichloroacetyl chloride, while maintaining the same between 20° C. and 118° C. and irradiating the same with actinic radiation, to convert the perchloroethylene to hexachloroethane, submitting the resultant product to fractional distillation and collecting the trichloroacetyl chloride fraction.

3. The method of purifying crude trichloroacetyl chloride containing 3-20% perchloroethylene as an impurity which comprises passing a current of gas consisting essentially of dry chlorine into said trichloroacetyl chloride, while maintaining the same between 20° C. and 118° C. and irradiating the same with actinic radiation, to convert the perchloroethylene to hexachloroethane, submitting the resultant product to fractional distillation and collecting the trichloroacetyl chloride fraction.

FREDERICK W. KIRKBRIDE.